(12) United States Patent
Ripberger, Jr. et al.

(10) Patent No.: US 8,740,002 B2
(45) Date of Patent: Jun. 3, 2014

(54) CAP-INSTALLATION SIGNAL SYSTEM FOR FILLER NECK CAP

(75) Inventors: John W. Ripberger, Jr., Losantville, IN (US); Joshua L. Rude, Connersville, IN (US)

(73) Assignee: Stant USA Corp., Connerville, IN (US)

( * ) Notice: Subject to any disclaimer, the term of this patent is extended or adjusted under 35 U.S.C. 154(b) by 573 days.

(21) Appl. No.: 13/041,235

(22) Filed: Mar. 4, 2011

(65) Prior Publication Data

US 2011/0240643 A1    Oct. 6, 2011

Related U.S. Application Data

(60) Provisional application No. 61/310,463, filed on Mar. 4, 2010.

(51) Int. Cl.
   *B60K 15/04* (2006.01)
   *G08B 3/02* (2006.01)
(52) U.S. Cl.
   CPC .............. *B60K 15/0406* (2013.01); *G08B 3/02* (2013.01); *B60K 15/04* (2013.01)
   USPC .. 220/295; 220/86.2; 220/203.1; 220/203.23; 116/100

(58) Field of Classification Search
   USPC ....... 220/DIG. 33, DIG. 32, 255, 86.2, 203.1, 220/203.23, 246, 295, 304, 795, 806, 220/203.26, 348; 206/495.1; 116/100
   See application file for complete search history.

(56) References Cited

U.S. PATENT DOCUMENTS

| | | | |
|---|---|---|---|
| 4,795,050 A * | 1/1989 | Smith et al. | 220/746 |
| 5,110,003 A | 5/1992 | MacWilliams | |
| 5,520,300 A * | 5/1996 | Griffin | 220/210 |
| 5,638,975 A | 6/1997 | Harris | |
| 5,732,841 A * | 3/1998 | Jocic et al. | 220/203.24 |
| 6,325,233 B1 | 12/2001 | Harris | |
| 6,739,472 B2 | 5/2004 | Newport | |
| 6,763,966 B2 | 7/2004 | Harris | |
| 2003/0205578 A1* | 11/2003 | Newport | 220/304 |

* cited by examiner

*Primary Examiner* — Robert J Hicks
*Assistant Examiner* — Kareen Rush
(74) *Attorney, Agent, or Firm* — Barnes & Thornburg LLP

(57) ABSTRACT

A filler neck cap is adapted to mate with and close a filler neck.

36 Claims, 6 Drawing Sheets

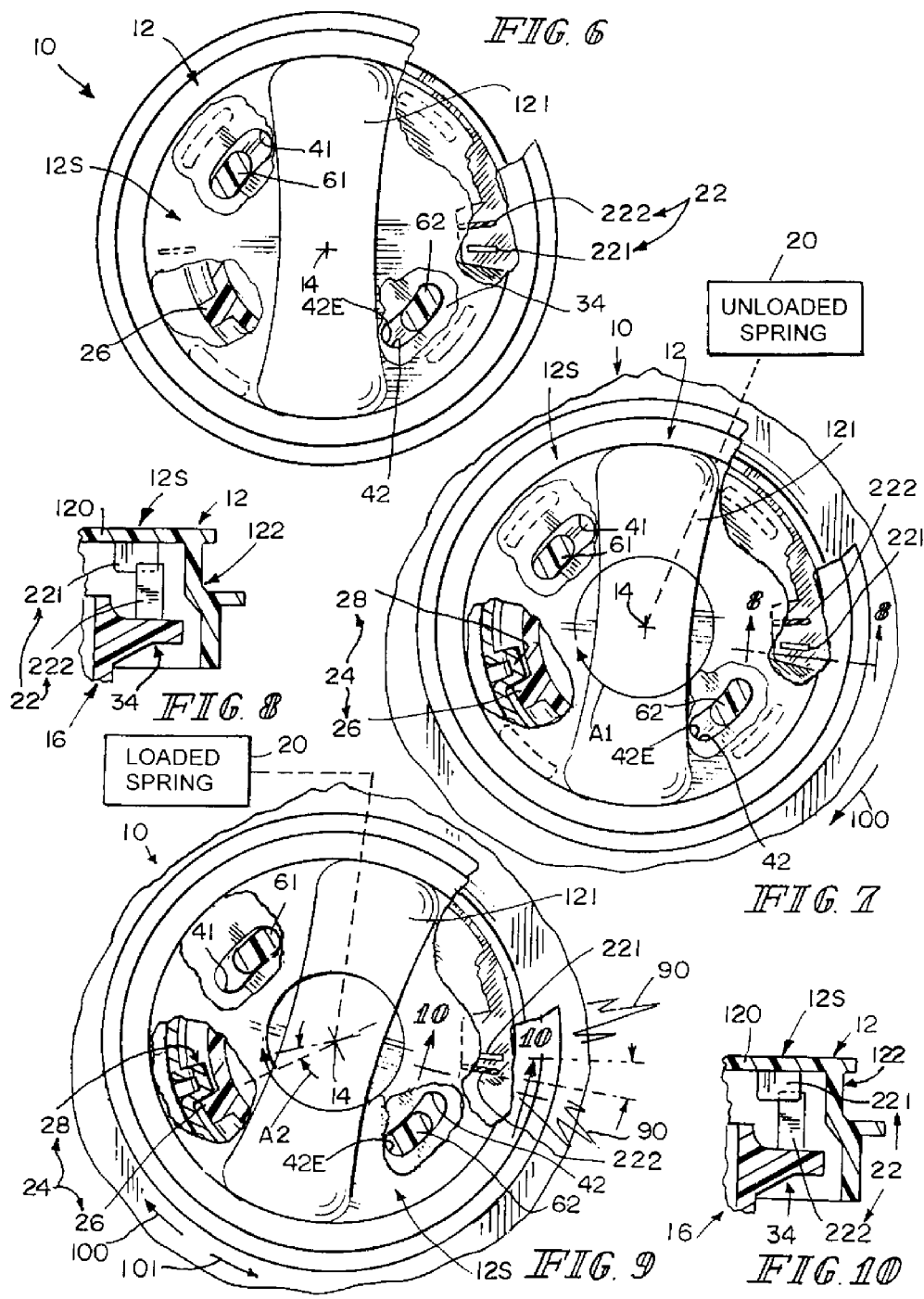

CAP-INSTALLATION SIGNAL SYSTEM FOR FILLER NECK CAP

PRIORITY CLAIM

This application claims priority under 35 U.S.C. §119(e) to U.S. Provisional Application Ser. No. 61/310,463, filed Mar. 4, 2010, which is expressly incorporated by reference herein.

BACKGROUND

The present disclosure relates to filler neck caps, and particularly to a rotatable cap for closing the open mouth of a filler neck. More particularly, the present disclosure relates to a filler neck closure cap designed to provide a cap-installation signal to a user to alert the user that the cap is installed in the filler neck.

SUMMARY

According to the present disclosure, a cap-installation signal system comprises a filler neck cap. The filler neck cap includes a handle and a closure adapted to mate with a fuel tank filler neck and close a mouth opening into a nozzle-receiving passageway formed in the filler neck. A user mounts the filler neck cap on the filler neck by applying a torque to turn the cap about an axis of rotation to rotate the closure to mate with the filler neck. Upon removal of the cap from the filler neck, a fuel-dispensing nozzle can be inserted into the nozzle-receiving passageway formed in the fuel tank filler neck through the open mouth to deliver fuel to the fuel tank.

In illustrative embodiments, filler neck cap also includes a rotary spring and a handle-rotation limit signaler. The rotary spring is configured to cause the closure to rotate in a first direction relative to the filler neck in response to rotation of the handle in the first direction about the axis of rotation. The handle-rotation limit signaler produces a discernable warning signal to inform the user when enough torque has been applied to the handle during cap installation to move the closure to a filler-neck closing position in the filler neck.

In illustrative embodiments, the closure includes a base sized to extend through the open mouth into the nozzle-receiving passageway formed in the filler neck and configured to carry an O-ring seal sized to mate with the filler neck. The base is configured to mate with the filler neck and trap the O-ring seal between the base and filler neck to establish the filler-neck closing position of the closure closing the open mouth formed in the filler neck. The closure further includes a torque-transmission member that is fixed to the base to lie in a stationary position relative to the base when the base is mated with the filler neck to retain the closure in the filler-neck closing position in the filler neck.

In illustrative embodiments, the rotary spring is coupled to an interior portion of the handle and to an exterior portion of the torque-transmission member. The rotary spring is a torsion spring.

In illustrative embodiments, the handle-rotation limit signaler includes an upstanding flexible finger coupled to the exterior portion of the base and a companion finger-deflecting lug coupled to the underside of the handle. The finger-deflecting lug is arranged to engage and deflect the upstanding flexible finger to produce a discernable warning signal such as an audible noise (e.g., a clicking sound) and/or a tactile sensation during cap installation in the filler neck after the closure has reached the filler-neck closing position and stopped rotating relative to the filler neck. The audible noise and/or tactile sensation will be a signal to the user that the closure is located in the filler-neck closing position and has been installed properly allowing the user to release the handle and know that the closure occupies the filler-neck closing position in the filler neck.

Energy stored in the rotary spring during continued rotation of the handle in the first direction relative to the stationary closure is then released once the user ungrips the handle. The handle is rotated automatically in an opposite second direction relative to the closure to assume a re-set removal-ready position by the rotary spring as it unwinds to release the stored energy.

In illustrative embodiments, a closure-rotation blocker is coupled to the base and to the filler neck. The closure-rotation blocker is configured to provide means for stopping further rotational movement of the base in the first direction about the axis of rotation and relative to the filler neck once the closure arrives at the filler-neck closing position. In illustrative embodiments, the base includes an external thread that extends into a thread-receiving channel formed in the filler neck to facilitate mating engagement of the base and the filler neck. In illustrative embodiments, the closure-rotation blocker includes a rotation-inhibitor tab coupled to an exterior portion of the base and an anti-rotation stop coupled to an interior portion of the filler neck and arranged to lie in the nozzle-receiving passageway and the thread-receiving channel formed in the filler neck to engage the rotation-inhibitor tab on the base during rotation of the closure in the first direction relative to the filer neck when the closure arrives at the filler-neck closing position.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIGS. 6-11 illustrate operation of the closure-rotation blocker and the handle-rotation limit signaler during installation of the filler neck cap of FIG. 3 into the filler neck of FIG. 3;

FIG. 6 is a top plan view of the filler neck cap of FIG. 3 with portions broken away;

FIG. 7 is a view similar to FIG. 6 after the closure has been inserted into a nozzle-receiving passageway formed in the filler neck and rotated in a clockwise cap-advancing direction until a rotation-inhibitor tab coupled to the closure contacts an anti-rotation stop coupled to the filler neck to block further clockwise rotation of the closure and thus establish the filler-neck closing position of the closure in the filler neck;

FIG. 8 is an enlarged sectional view taken along line 8-8 of FIG. 7 showing a downwardly extending finger-deflecting lug coupled to the underside of the handle and included in the handle-rotation limit signaler and also showing an upstanding flexible finger coupled to the base of the closure and also included in the handle-rotation limit signaler;

FIG. 9 is a view similar to FIGS. 6 and 7 suggesting that the finger-deflecting lug on the rotating handle engages the upstanding flexible finger on the stationary base of the closure to produce a discernable warning signal such as an audible noise and/or a tactile sensation to alert the user turning the handle that the closure has seated in the filler neck and arrived at the filler-neck closing position and showing that the handle has rotated about 10° further in the clockwise direction owing to movement of two anti-rotation posts included in the handle in two arcuate lost-motion slots formed in the torque-transmission member of the underlying closure to apply a torque load of about 1.5 Nm to the rotary spring to store energy in the rotary spring;

FIG. 10 is an enlarged sectional view taken along line 10-10 of FIG. 9; and

FIG. 11 is a view similar to FIGS. 6, 7, and 9 showing counterclockwise rotation of the handle relative to the stationary closure to the position shown in FIG. 7 in response to a rotation-inducing torque applied to the handle by the loaded rotary spring (as it unwinds and releases stored energy) to re-set the position of the handle relative to the closure to a removal-ready position after the user releases a grip on the handle to prepare for later cap removal.

DETAILED DESCRIPTION

Figure 1:
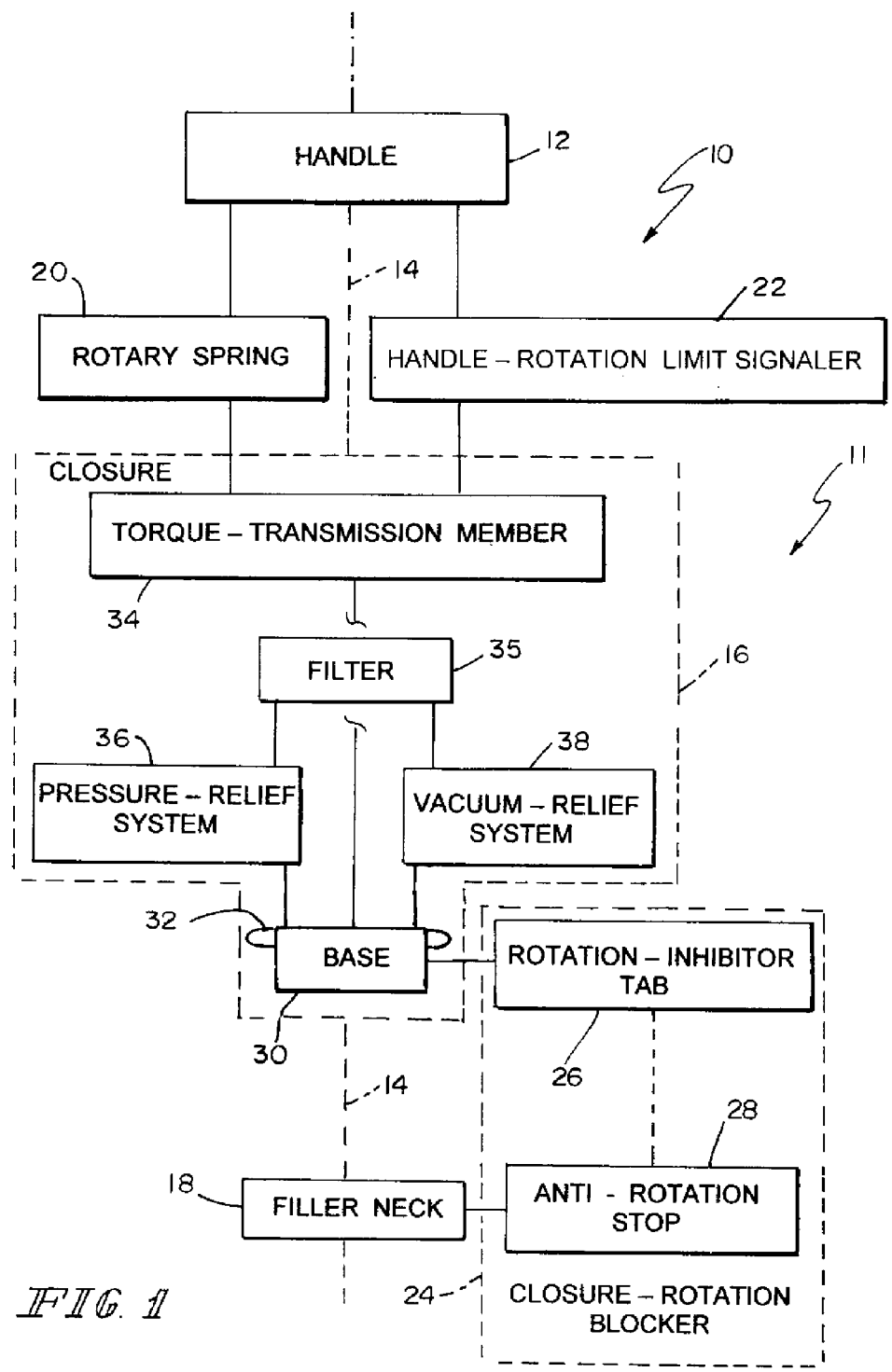
FIG. 1 is a block diagram of a cap-installation signal system for a filler neck cap showing a handle, a closure, a rotary spring coupled to the handle and to the closure (e.g., a torque-transmission member in the closure), a handle-rotation limit signaler coupled to the handle and to the closure (e.g., a base included in the closure), and a closure-rotation blocker including a rotation-inhibitor tab coupled to a base included in the closure and configured to carry an O-ring seal and an anti-rotation stop coupled to a filler neck and arranged to mate with the rotation inhibitor tab and stop rotation of the rotating closure during mounting of the filler neck cap on the filler neck once the closure arrives at a filler-neck closing position in the filler neck.
Figure 2:
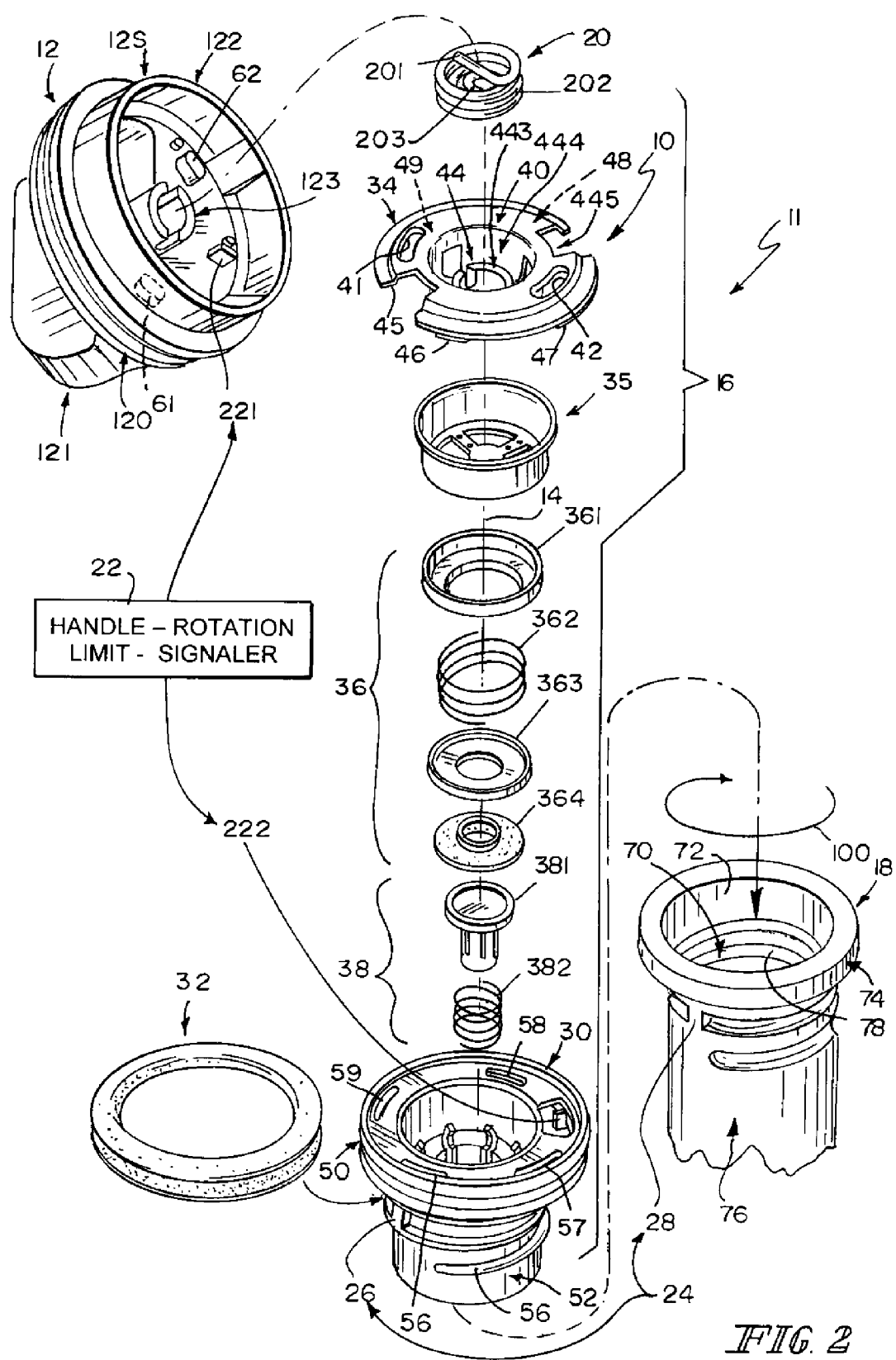
FIG. 2 is an exploded perspective assembly view of a filler neck and a filler neck cap in accordance with the present disclosure, the cap including a handle, a rotary spring, a closure comprising a torque-transmission member, a filter, a cover plate, a pressure-relief spring, a seal plate, a gasket, a vacuum valve, a vacuum-relief spring, a base formed to include an external thread, and an O-ring seal.
Figure 3:
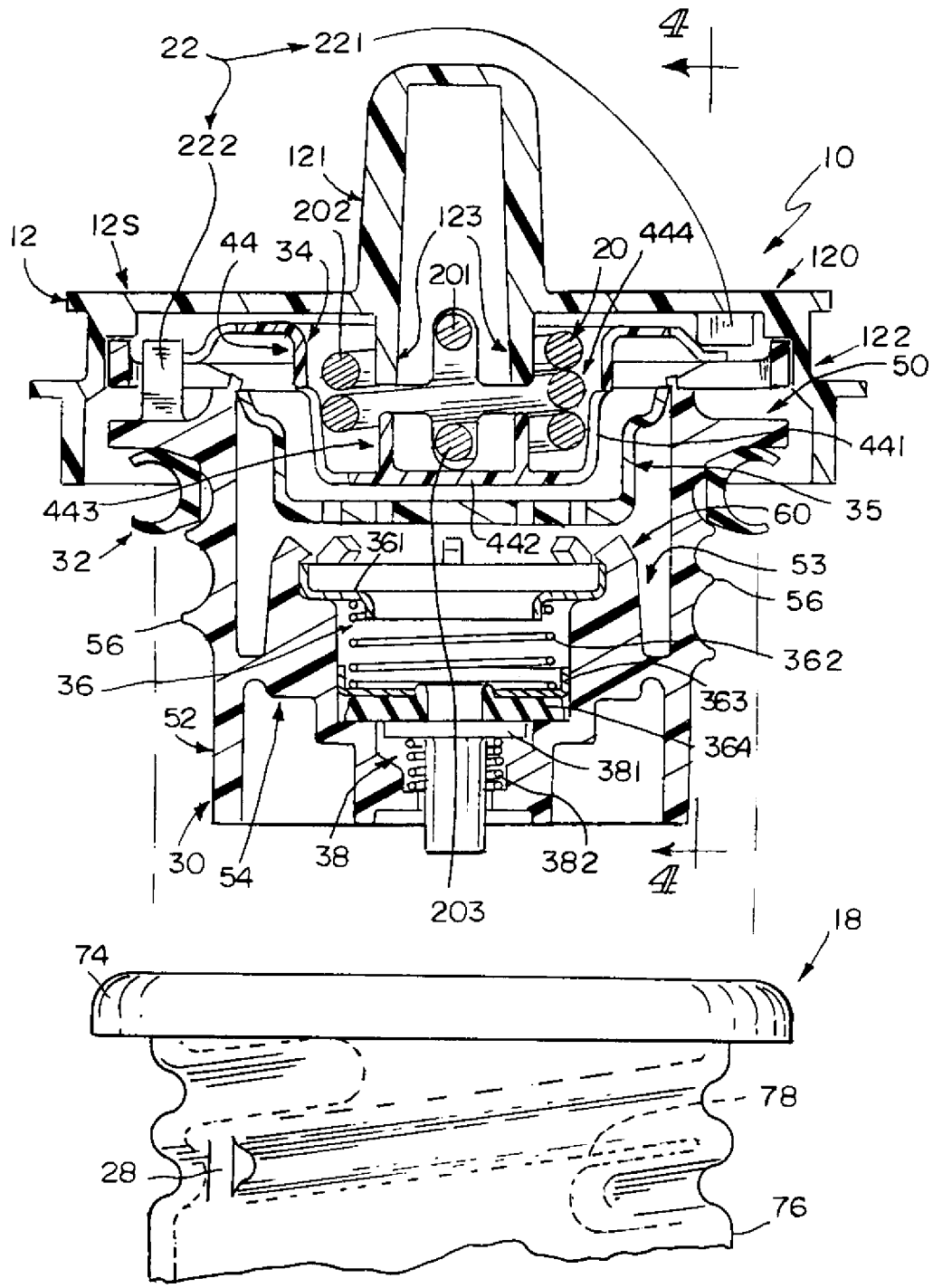
FIG. 3 is a side elevation view of the filler neck cap of FIG. 2 (after assembly) prior to insertion of the cap into the mouth of a filler neck, with portions broken away, showing the filler neck cap after it has been assembled.

Filler neck cap 10 includes a handle 12 rotatable about an axis of rotation 14, a closure 16 adapted to close a filler neck 18, a rotary spring 20 coupled to handle 12 and closure 16, and a handle-rotation limit signaler 22 coupled to handle 12 and closure 16 as suggested diagrammatically in FIG. 1 and illustratively in FIGS. 2 and 3. A closure-rotation blocker 24 includes a rotation-inhibitor tab 26 coupled to closure 16 and arranged to mate with an anti-rotation stop 28 coupled to filler neck 18 as suggested diagrammatically in FIG. 1 and illustratively in FIGS. 4 and 5. Tab 26 and stop 28 cooperate to provide means for stopping further rotational movement of closure 16 about axis of rotation 14 in a clockwise cap-advancing direction 100 once closure 16 is mounted properly in filler neck 18 to assume a filler-neck closing position as suggested in FIG. 7. Handle-rotation limit signaler 22 functions to signal a user rotating handle 12 in a clockwise, cap-advancing direction 100 during installation of cap 10 in filler neck 18 that sufficient torque has been applied to handle 12 by the user during installation of closure 16 in filler neck 18 to seat closure 16 properly in the filler-neck closing position in a passageway 70 formed in filler neck 18 as suggested in FIG. 9.

Figure 4:
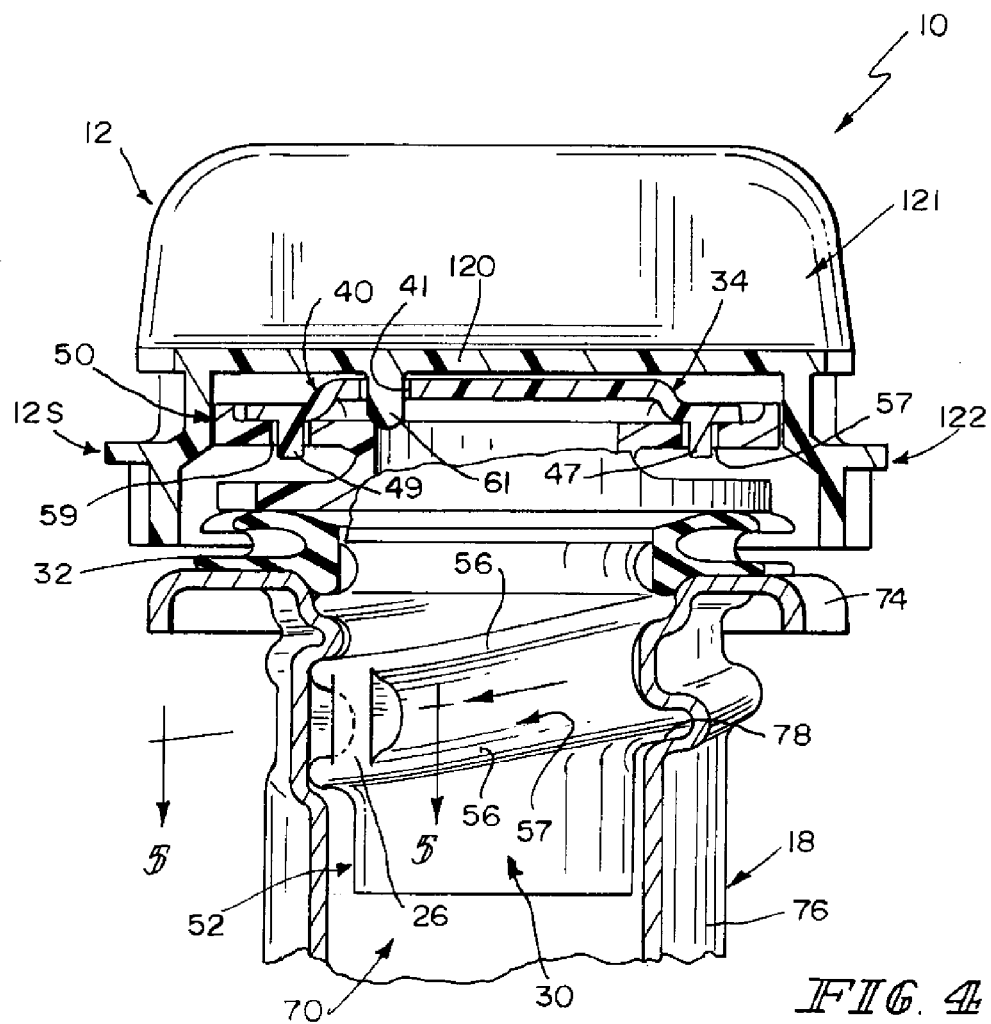
FIG. 4 is a sectional view taken along line 4-4 of FIG. 3.

Closure 16 includes a base 30 adapted to mate with filler neck 18, an O-ring seal 32 coupled to base 30 to move therewith and configured to mate with filler neck 18 to establish a sealed connection between base 30 and filler neck 18, and a torque-transmission member 34 fixed to base 30 to lie in a stationary position on base 30 as shown diagrammatically in FIG. 1 and illustratively in FIGS. 2-4. Closure 16 further includes a filter 35, a pressure-relief system 36 comprising a cover plate 361, a pressure spring 362, a seal plate 363, and a pressure-relief valve 364 made of a gasket material, and a vacuum-relief system 38 comprising a vacuum-relief valve 381 and a vacuum spring 382 as suggested diagrammatically in FIG. 1 and illustratively in FIGS. 2 and 3.

Torque-transmission member 34 is arranged to overlie base 30 and is coupled to base 30 to lie in a stationary position on base 30 and rotate therewith about axis of rotation 14 during installation of closure 16 in filler neck 18. Torque-transmission member 34 includes an annular web 40 and a cup 44 coupled to an interior edge of annular web 40 as suggested in FIGS. 2 and 3. Annular web 40 is formed to include first and second arcuate lost-motion slots 41, 42 and the center of curvature of each of slots 41, 42 is axis of rotation 14.

Torque-transmission member 34 also includes four circumferentially spaced-apart torque-transmission lugs 46, 47, 48, and 49 coupled to an underside 45 of annular web 40 and arranged to extend downwardly toward base 30 as suggested in FIG. 2. Base 30 includes an upper plate 50 arranged to underlie annular web 40 and formed to include four circumferentially spaced-apart lug-receiving slots 56, 57, 58, and 59 as shown, for example, in FIG. 2. Each of the torque-transmission lugs 46-49 extends into a companion one of the lug-receiving slots 56-59 to cause base 30 to rotate about axis 14 in response to rotation of torque-transmission member 34 about axis 14 during rotation of handle 12 and rotary spring 20 about axis 14 as suggested in FIGS. 2 and 4.

Cup 44 of torque-transmission member 34 includes a ring-shaped side wall 441, a floor 442 coupled to ring-shaped side wall 441, and an upstanding lower spring mount 443 coupled to an upwardly facing surface of floor 442 as suggested in FIGS. 2 and 3. Side wall 441 and floor 442 cooperate to form a spring chamber 444 and rotary spring 20 is arranged to lie in spring chamber 444 and under handle 12 when spring 20 is coupled to lower spring mount 443 as suggested in FIG. 3.

Torque-transmission member 34 cooperates with the underlying base 30 to form an interior region 60 therebetween as suggested in FIG. 3. Filter 34, pressure-relief system 36, and vacuum-relief system 38 are mounted in interior region 60 and arranged to underlie cup 44 of torque-transmission member 34 as suggested in FIG. 3.

Handle 12 includes a shell 12S comprising a top plate 120, a hand grip 121 coupled to an outer portion of top plate 120, an annular rim 122 coupled to a perimeter edge of top plate 120 and arranged to surround annular web 40 of torque-transmission member 34, and an upper spring mount 123 coupled to a downwardly facing surface of top plate 120 as suggested in FIGS. 2 and 3. Rotary spring 20 is coupled at one end to upper spring mount 123 of shell 12S and at another end to lower spring mount 443 of torque-transmission member 34 as shown, for example, in FIG. 3. Rotary spring 20 is a coiled torsion spring configured to transmit torque from handle 12 to torque-transmission member 34 which is coupled to base 30 by means of torque-transmission lugs 46-49 to cause closure 16 to rotate relative to filler neck 18 about axis of rotation 14 to engage or disengage filler neck 18 during cap installation and removal.

Handle 12 also includes first and second anti-rotation posts 61, 62 coupled to shell 12S as suggested in FIG. 2. In an illustrative embodiment, first and second anti-rotation posts 61, 62 are appended to an underside of top plate 120 and arranged to extend downwardly toward closure 16 as suggested in FIGS. 2, 6, 7, 9, and 11.

Each of anti-rotation posts 61, 62 extends into a companion one of the first and second arcuate lost-motion slots 41, 42 formed in annular web 40 of torque-transmission member 34 of closure 16 as suggested in FIGS. 2, 4, and 6. Each of anti-rotation posts 61, 62 is arranged to lie in a position located between annular rim 122 and upper spring mount 123. Some limited movement of anti-rotation posts 61, 62 in companion lost-motion slots 41, 42 is permitted as suggested in FIGS. 7 and 9 after base 30 of closure 16 stops rotating in filler neck 18 and closure 16 arrives at its filler-neck closing position in nozzle-receiving passageway 70 formed in filler neck 18. Anti-rotation posts 61, 62 engage torque-transmission member 30 as suggested in FIG. 9 to block any further rotation of handle 12 relative to the stationary base 30 about axis of rotation 14 in clockwise direction 100.

Handle-rotation limit signaler 22 includes a downwardly extending finger-deflecting lug 221 appended to the underside of top plate 120 of handle 12 and an upstanding flexible finger 222 appended to upper plate 50 of base 30 as suggested in FIGS. 2 and 3. Finger-deflecting lug 221 is arranged to engage and deflect upstanding flexible finger 222 during motion of rotating handle 12 relative to the now-stationary closure 16 once closure 16 stops rotating relative to filler neck 18 during cap installation as suggested in FIGS. 7-11. Such engagement and deflection produces a discernable warning signal such as an audible noise and/or a tactile sensation represented by symbol 90 to the user turning handle 12 during cap installation as suggested in FIG. 9.

Filler neck 18 is formed to include a nozzle-receiving passageway 70 and a mouth 72 opening into nozzle-receiving passageway 70 as suggested in FIG. 2. Outer rim 74 is formed to include mouth 72. Pipe 76 is formed to include a nozzle-receiving passageway 70 sized to receive a fuel-dispensing pump nozzle (not shown) therein during a fuel tank refueling activity. Pipe 76 is formed to include an internal helical thread-receiving channel 78 opening into nozzle-receiving passageway 70 as suggested in FIGS. 2 and 3. An anti-rotation stop 28 included in closure-rotation blocker 24 is coupled to filler neck 18 and located in thread-receiving channel 78 as suggested in FIGS. 2-5.

Base 30 of closure 16 further includes a sleeve 52 coupled to upper plate 50 and arranged to extend downwardly from upper plate 50 and away from handle 12 as suggested in FIGS. 2 and 3. Base 30 also includes a valve support 54 coupled to sleeve 52 and located in an interior region 53 formed in sleeve 52 as suggested in FIG. 3. Valve support 54 is configured to provide means for supporting pressure-relief system 36 and vacuum-relief system 38 in interior region 53 as shown, for example, in FIG. 3. Base 30 further includes a helical external thread 56 sized to fit and move in thread-receiving channel 78 formed in pipe 76 of filler neck 18 during cap installation and removal as suggested in FIGS. 2-4.

Figure 5:
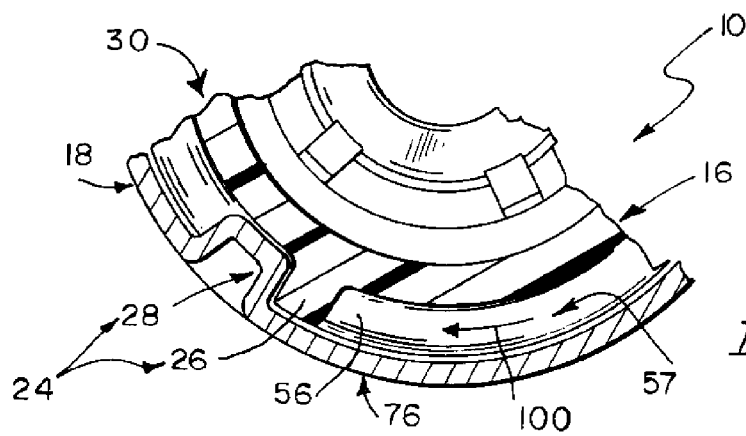
FIG. 5 is an enlarged partial sectional view taken along line 5-5 of FIG. 4.
Figure 11:
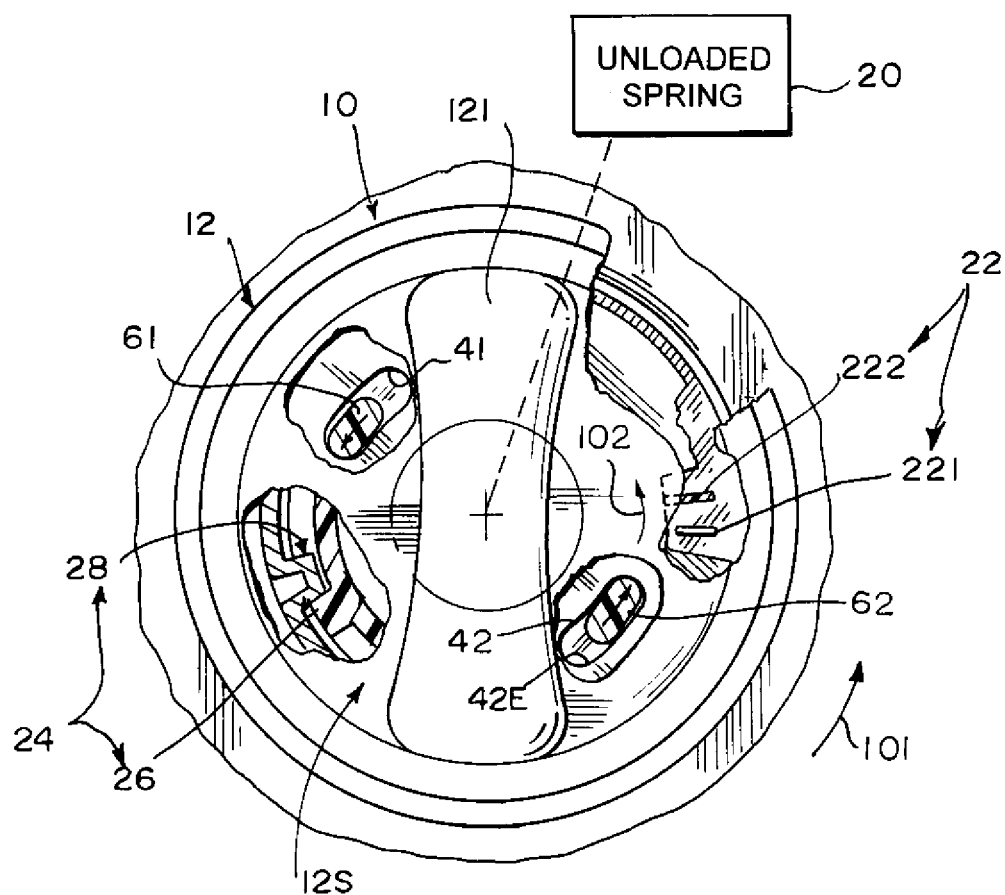

A rotation-inhibitor tab 26 included in closure-rotation blocker 24 is coupled to sleeve 52 of base 30 and interposed in a space 57 provided between two neighboring flights of helical external thread 56 as shown, for example, in FIGS. 2, 4, and 5. Rotation-inhibitor tab 26 on sleeve 52 of base 30 and anti-rotation stop 28 on pipe 76 of filler neck 18 cooperate to define closure-rotation blocker 24 as shown diagrammatically in FIG. 1 and illustratively in FIG. 5. Closure-rotation blocker 24 is configured to define means for stopping rotation of closure 16 relative to filler neck 18 about axis of rotation 14 during cap installation upon arrival of closure 16 at the filler-neck closing position in nozzle-receiving passageway 70 formed in pipe 76 of filler neck 18 as suggested in FIGS. 4 and 5.

During an illustrative cap installation process, a user turns handle 12 in a clockwise direction 100 about axis of rotation 14 after base 30 of closure 16 is extended into nozzle-receiving passageway 70 formed in filler neck 18 through open mouth 72. Clockwise rotation of handle 12 about axis of rotation 14 turns rotary spring 20 in clockwise direction 100 about axis of rotation 14 to cause rotary spring 20 to turn torque-transmission member 34 and base 30 in clockwise direction 100 so that helical external thread 56 on base 30 engages thread-receiving channel 78 formed in filler neck 18.

After nearly 360° of clockwise rotation of handle 12 about axis of rotation 14 through an initial rotation angle A1 (see FIG. 7), closure 16 arrives at the filler-neck closing position in filler neck 18 as suggested in FIG. 7. At this point, base 30 and torque-transmission member 34 stop turning in filler neck 18. However, as suggested in FIG. 9, handle 12 continues to turn in clockwise direction 100 in response to a torque applied by the user to rotate handle 12 about axis of rotation 14 through a subsequent rotation angle A2 (see FIG. 9) of about 10° (which rotation angle A2 is established by the arc length of arcuate lost-motion slots 41, 42 formed in torque-transmission member 34). As suggested in FIG. 9, the sum of initial rotation angle A1 and subsequent rotation angle A2 is greater than 360° in an illustrative embodiment.

Once handle 12 has been turned by the user to reach the position shown in FIG. 9, a torque load of about 1.5 Nm will have been applied to rotary spring 20 to store energy in rotary spring 20 since the lower end of rotary spring 20 is fixed to stationary lower spring mount 423 and the upper end of rotary spring 20 is coupled to rotatable handle 12. Also, anti-rotation post 61 included in handle 12 will have moved in arcuate first lost-motion slot 41 to contact an end wall associated with slot 41 and anti-rotation post 62 included in handle 12 will have moved in arcuate second lost-motion slot 42 to contact an end wall associated with slot 42 so as to block further rotation of handle 12 in clockwise direction 100 relative to the stationary closure 16 about axis of rotation 14. At such point, it is expected that the user will release a grip on handle 12 after hearing an audible noise (e.g., a clicking noise) or experiencing a tactile sensation (represented by symbol 90 in FIG. 9) caused by a snap of the stationary upstanding flexible finger 222 in response to temporary engagement and deflection by the rotating finger-deflecting lug 221 coupled to handle 22. The stored energy in the loaded rotary spring is released and a torque of about 1.5 Nm is applied to handle 12 to rotate handle 12 in a counterclockwise direction 102 about axis of rotation 14 to re-set handle 12 relative to closure 16 in the removal-ready position shown, for example, in FIG. 11. In effect, loaded rotary spring 20 (see FIG. 9) twists back to assume a resting position (see FIG. 11).

Rotary spring 20 is configured to apply cap-installation and cap-removal torque to closure 16. This minimizes torque influence by environmental factors such as temperature and humidity. Dimensional stack-up, fatigue, deterioration, and wear of components made of plastics materials does not control torque applied to closure 16 during cap installation and removal. Rotary spring 20 is made of stainless steel in an illustrative embodiment. Any future torque requirement change can be implemented easily with a torsion spring change.

A cap-installation signal system 11 for a filler neck 18 includes a handle 12, a closure 16, and a rotary spring 20 as suggested in FIGS. 1 and 2. Handle 12 is rotatable about an axis of rotation 14 as suggested in FIGS. 2, 6, 7, 9, and 11.

Closure 16 is adapted to close filler neck 18 as suggested in FIG. 4. Rotary spring 20 is coupled to handle 12 and to closure 16 to cause closure 16 to rotate in first direction 100 about axis of rotation 14 in a nozzle-receiving passageway 70 formed in filler neck 18 in response to rotation of handle 12 in first direction 100 about axis of rotation 14 as suggested in FIGS. 2 and 6-9.

Cap-installation signal system 11 also includes a handle-rotation limit signaler 22 including a finger 222 coupled to closure 16 to rotate therewith as suggested in FIGS. 2 and 6-9. Lug 221 is arranged on handle 12 to intercept finger 222 during rotation of handle 12 in first direction 100 relative to closure 16 once closure 16 has reached a filler neck-closing position in filler neck 18 and ceases to rotate about axis of rotation 14 as suggested in FIGS. 6-9. Finger 222 and lug 221 cooperate to provide means for producing a discernable warning signal 90 in response to temporary engagement of lug 221 and finger 222 as suggested in FIG. 9 during rotation of handle 12 relative to closure 16 in first direction 100 to alert a user rotating handle 12 that closure 16 has reached the filler-neck closing position in filler neck 18 and ceased to rotate.

Handle 12 includes a shell 12S coupled to rotary spring 20 and configured to provide an external hand grip 121 as suggested in FIGS. 2 and 4. Handle 12 also includes an anti-rotation post 62 coupled to shell 12S to rotate therewith about axis of rotation 14 and to extend into a lost-motion slot 42 formed in closure 16 as suggested in FIGS. 2 and 6. Rotary spring 20 is configured normally to rotate handle 12 in an opposite second direction 101 about axis of rotation 14 relative to closure 16 to establish an initial position (shown in FIG. 6) of anti-rotation post 62 in lost-motion slot 42 formed in closure 16 as suggested in FIG. 9.

Anti-rotation post 62 is arranged to move in lost-motion slot 42 in response to rotation of shell 12S in first direction 100 about axis of rotation 14 toward an end wall 42E associated with lost-motion slot 42 relative to closure 16 once closure 16 has been rotated in filler neck 18 to assume the filler-neck closing position as suggested in FIG. 9. Lug 221 and finger 222 are arranged to mate temporarily and produce the discernable warning signal 90 as suggested in FIG. 9 during movement of anti-rotation post 62 in lost-motion slot 42 between the initial position (shown in FIG. 6) and a limit position (shown in FIG. 9) engaging end wall 42E associated with lost-motion slot 42.

Closure 16 includes a base 30 adapted to mate with filler neck 18 and a torque-transmission member 34 coupled to base 12 to rotate therewith as suggested in FIGS. 1, 2, and 4. Torque-transmission member 34 is arranged to lie in confronting relation to handle 12 as suggested in FIGS. 2 and 3. Torque-transmission member 34 is formed to include lost-motion slot 42 as suggested in FIGS. 2 and 6. Finger 222 is coupled to base 30 to rotate therewith as suggested in FIG. 2.

Torque-transmission member 34 is formed to include a finger-receiving channel 445 as suggested in FIG. 2. Finger 222 is arranged to extend upwardly from base 30 and through the finger-receiving channel 445 to cause a free end of finger 22 to lie above torque-transmission member 34 in a position to intercept and contact temporarily lug 221 to produce discernable warning signal 90 during movement of anti-rotation post 62 in lost-motion slot 42 formed in torque-transmission member 34 from the initial position (FIG. 6) toward the limit position (FIG. 9) as suggested in FIGS. 6-10.

Torque-transmission member 34 includes an annular web 40 formed to include lost-motion slot 42 and a cup 44 coupled to an interior edge of annular web 40 as suggested in FIG. 2. Cup 44 is configured to include a spring chamber 444 receiving a lower portion of rotary spring 20 as suggested in FIGS. 2 and 3.

Shell 12S includes an upper spring mount 123 arranged to extend downwardly into spring chamber 444 formed in cup 44 as suggested in FIG. 3. Cup 44 includes a lower spring mount 443 located in spring chamber 444 below upper spring mount 123. Rotary spring 20 is a torsion spring having an upper tang 201 coupled to upper spring mount 123, a lower tang 203 coupled to lower spring mount 443, and a coiled portion 202 arranged to wind around axis of rotation 14 and interconnect upper and lower tangs 201, 203 as suggested in FIGS. 2 and 3.

Closure 16 further includes a pressure-relief system 36 located below cup 44 in an interior region 60 formed between torque-transmission member 34 and base 30 as suggested in FIG. 3. Base 30 includes an annular upper plate 50 arranged to underlie annular web 40. Finger 222 is coupled to annular upper plate 50 and arranged to extend upwardly through a finger-receiving channel 445 formed in torque-transmission member 34 toward an underside of shell 12S.

Shell 12S includes a top plate 120 arranged to overlie closure 16 and a hand grip 121 coupled to top plate 120 and arranged to extend away from closure 16. Anti-rotation post 62 is coupled to an underside of top plate 120 and arranged to extend downwardly into lost-motion slot 42 formed in closure 16. Lug 221 is coupled to the underside of top plate 120 and arranged to lie in spaced-apart relation to anti-rotation post 62 and extend downwardly toward closure 16.

Finger 222 of handle-rotation limit signaler 22 is made of a flexible material and arranged to extend upwardly toward the underside of top plate 120 of shell 12S as suggested in FIGS. 2 and 3. Lug 221 of handle-rotation limit signaler 22 is arranged to engage and deflect the upwardly extending finger 222 to produce discernable warning signal 90 during rotation of handle 12 about axis of rotation 14 relative to closure 16 once closure 16 stops rotating relative to filler neck 18 during installation of closure 16 in filler neck 18 as suggested in FIG. 9.

Shell 12S further includes an upper spring mount 123 extending downwardly from top plate 120 into a spring chamber 444 formed in closure 16 to mate with an upper end 201 of rotary spring 20 located in spring chamber 444 as suggested in FIGS. 2 and 3. Closure 16 further includes a lower spring mount 443 located in spring chamber 444 and coupled to a lower end 203 of rotary spring 202. Shell 12S further includes an annular rim 122 coupled to a perimeter edge of top plate 120. Each of anti-rotation post 62 and lug 221 are arranged to lie in a space provided between upper spring mount 123 and annular rim 122 as suggested in FIG. 2.

Closure-rotation blocker 24 includes an anti-rotation stop 28 and a rotation-inhibitor tab 26 as suggested in FIGS. 1, 2, and 7. Anti-rotation stop 28 is located in a stationary position in a filler neck 18 formed to include a nozzle-receiving passageway 70 closed by closure 16 once closure 16 has reached the filler-neck closing position. Rotation-inhibitor tab 26 is coupled to an external portion of closure 16 to rotate therewith and arranged to mate with anti-rotation stop 28 during rotation of closure 16 about axis of rotation 14 in first direction 100 to block further rotation of closure 16 in first direction 100 without inhibiting further rotation of handle 12 relative to closure 16 about axis of rotation 14 in first direction 100 to allow temporary engagement of lug 221 on handle 12 as handle 12 rotates in first direction 100 relative to closure 16 to produce discernable warning signal 90 to inform a user rotating handle 12 that closure 16 has already reached the filler-neck closing position in filler neck 18 as suggested in FIG. 9.

Rotary spring 20 is configured to store energy during rotation of handle 12 in first direction 100 relative to closure 16 about axis of rotation 14 as suggested in FIG. 9. Rotary spring 20 is configured to release stored energy once a user ungrips handle 12 after discernable warning signal 90 has been produced to provide means for rotating handle 12 relative to closure 10 about axis of rotation 14 in an opposite second direction 101 to return handle 12 to a predetermined removal-ready position (see FIG. 6) relative to closure 16 as suggested in FIG. 11.

The invention claimed is:

1. A cap-installation signal system for a filler neck, the system comprising
   a handle rotatable about an axis of rotation,
   a closure adapted to close the filler neck,
   a rotary spring coupled to the handle and to the closure to cause the closure to rotate in the first direction about the axis of rotation when the closure is inserted in a nozzle-receiving passageway formed in the filler neck in response to rotation of the handle in the first direction about the axis of rotation, and
   a handle-rotation limit signaler including a finger coupled to the closure to rotate therewith and a lug coupled directly to the handle to rotate therewith and to intercept the finger during rotation of the handle in the first direction relative to the closure once the closure has reached a filler neck-closing position in the filler neck and ceases to rotate about the axis of rotation, and the finger and the lug cooperate to produce a discernable warning signal in response to temporary engagement of the lug and finger during rotation of the handle relative to the closure in the first direction to alert a user rotating the handle that the closure has reached the filler-neck closing position in the filler neck and ceased to rotate.

2. The cap-installation signal system of claim 1, wherein the closure is formed to include a lost-motion slot and the handle includes a shell coupled to the rotary spring and configured to provide an external hand grip and an anti-rotation post coupled to the shell to rotate therewith about the axis of rotation and to extend into the lost-motion slot formed in the closure, the rotary spring is configured normally to rotate the handle in an opposite second direction about the axis of rotation relative to the closure to establish an initial position of the anti-rotation post in the lost-motion slot formed in the closure, the anti-rotation post is arranged to move in the lost-motion slot in response to rotation of the shell in the first direction about the axis of rotation toward an end wall associated with the lost-motion slot relative to the closure once the closure has been rotated in the filler neck to assume the filler-neck closing position, and the lug and finger are arranged to mate temporarily and produce the discernable warning signal during movement of the anti-rotation post in the lost-motion slot between the initial position and a limit position engaging the end wall associated with the slot.

3. A cap-installation signal system for a filler neck, the system comprising
   a handle rotatable about an axis of rotation,
   a closure adapted to close the filler neck,
   a rotary spring coupled to the handle and to the closure to cause the closure to rotate in the first direction about the axis of rotation when the closure is inserted in a nozzle-receiving passageway formed in the filler neck in response to rotation of the handle in the first direction about the axis of rotation, and
   a handle-rotation limit signaler including a finger coupled to the closure to rotate therewith and a lug coupled to the handle to rotate therewith and to intercept the finger during rotation of the handle in the first direction relative to the closure once the closure has reached a filler neck-closing position in the filler neck and ceases to rotate about the axis of rotation, and the finger and the lug cooperate to produce a discernable warning signal in response to temporary engagement of the lug and finger during rotation of the handle relative to the closure in the first direction to alert a user rotating the handle that the closure has reached the filler-neck closing position in the filler neck and ceased to rotate,
   wherein the closure is formed to include a lost-motion slot and the handle includes a shell coupled to the rotary spring and configured to provide an external hand grip and an anti-rotation post coupled to the shell to rotate therewith about the axis of rotation and to extend into the lost-motion slot formed in the closure, the rotary spring is configured normally to rotate the handle in an opposite second direction about the axis of rotation relative to the closure to establish an initial position of the anti-rotation post in the lost-motion slot formed in the closure, the anti-rotation post is arranged to move in the lost-motion slot in response to rotation of the shell in the first direction about the axis of rotation toward an end wall associated with the lost-motion slot relative to the closure once the closure has been rotated in the filler neck to assume the filler-neck closing position, and the lug and finger are arranged to mate temporarily and produce the discernable warning signal during movement of the anti-rotation post in the lost-motion slot between the initial position and a limit position engaging the end wall associated with the slot, and
   wherein the closure includes a base adapted to mate with the filler neck and a torque-transmission member coupled to the base to rotate therewith and arranged to lie in confronting relation to the handle, the torque-transmission member is formed to include the lost-motion slot, and the finger is coupled to the base to rotate therewith.

4. The cap-installation signal system of claim 3, wherein the torque-transmission member is formed to include a finger-receiving channel and the finger is arranged to extend upwardly from the base and through the finger-receiving channel to cause a free end of the finger to lie above the torque-transmission member in a position to intercept and contact temporarily the lug to produce the discernable warning signal during movement of the anti-rotation post in the lost-motion slot formed in the torque-transmission member from the initial position toward the limit position.

5. The cap-installation signal system of claim 3, wherein the torque-transmission member includes an annular web formed to include the lost-motion slot and a cup coupled to an interior edge of the annular web and configured to include a spring chamber receiving a lower portion of the rotary spring.

6. The cap-installation signal system of claim 5, wherein the shell includes an upper spring mount arranged to extend downwardly into a spring chamber formed in the cup, the cup includes a lower spring mount located in the spring chamber below the upper spring mount, and the rotary spring is a torsion spring having an upper tang coupled to the upper spring mount, a lower tang coupled to the lower spring mount, and a coiled portion arranged to wind around the axis of rotation and interconnect the upper and lower tangs.

7. The cap-installation signal system of claim 5, wherein the closure further includes a pressure-relief system located below the cup in an interior region formed between the torque-transmission member and the base.

8. The cap-installation signal system of claim 5, wherein the base includes an annular upper plate arranged to underlie the annular web and the finger is coupled to the annular upper plate and arranged to extend upwardly through a finger-receiving channel formed in the torque-transmission member toward an underside of the shell.

9. A cap-installation signal system for a filler neck, the system comprising
a handle rotatable about an axis of rotation,
a closure adapted to close the filler neck,
a rotary spring coupled to the handle and to the closure to cause the closure to rotate in the first direction about the axis of rotation when the closure is inserted in a nozzle-receiving passageway formed in the filler neck in response to rotation of the handle in the first direction about the axis of rotation, and
a handle-rotation limit signaler including a finger coupled to the closure to rotate therewith and a lug coupled to the handle to rotate therewith and to intercept the finger during rotation of the handle in the first direction relative to the closure once the closure has reached a filler neck-closing position in the filler neck and ceases to rotate about the axis of rotation, and the finger and the lug cooperate to produce a discernable warning signal in response to temporary engagement of the lug and finger during rotation of the handle relative to the closure in the first direction to alert a user rotating the handle that the closure has reached the filler-neck closing position in the filler neck and ceased to rotate,
wherein the closure is formed to include a lost-motion slot and the handle includes a shell coupled to the rotary spring and configured to provide an external hand grip and an anti-rotation post coupled to the shell to rotate therewith about the axis of rotation and to extend into the lost-motion slot formed in the closure, the rotary spring is configured normally to rotate the handle in an opposite second direction about the axis of rotation relative to the closure to establish an initial position of the anti-rotation post in the lost-motion slot formed in the closure, the anti-rotation post is arranged to move in the lost-motion slot in response to rotation of the shell in the first direction about the axis of rotation toward an end wall associated with the lost-motion slot relative to the closure once the closure has been rotated in the filler neck to assume the filler-neck closing position, and the lug and finger are arranged to mate temporarily and produce the discernable warning signal during movement of the anti-rotation post in the lost-motion slot between the initial position and a limit position engaging the end wall associated with the slot, and
wherein the shell includes a top plate arranged to overlie the closure and a hand grip coupled to the top plate and arranged to extend away from the closure, the anti-rotation post is coupled to an underside of the top plate and arranged to extend downwardly into the lost-motion slot formed in the closure, and the lug is coupled to the underside of the top plate and arranged to lie in spaced-apart relation to the anti-rotation post and extend downwardly toward the closure.

10. The cap-installation signal system of claim 9, wherein the finger of the handle-rotation limit signaler is made of a flexible material and arranged to extend upwardly toward the underside of the top plate of the shell and the lug of the handle-rotation limit signaler is arranged to engage and deflect the upwardly extending finger to produce the discernable warning signal during rotation of the handle about the axis of rotation relative to the closure once the closure stops rotating relative to the filler neck during installation of the closure in the filler neck.

11. The cap-installation signal system of claim 9, wherein the shell further includes an upper spring mount extending downwardly from the top plate into a spring chamber formed in the closure to mate with an upper end of the rotary spring located in the spring chamber, the closure further includes a lower spring mount located in the spring chamber and coupled to a lower end of the rotary spring, the shell further includes an annular rim coupled to a perimeter edge of the top plate, and each of the anti-rotation post and the lug are arranged to lie in a space provided between the upper spring mount and the annular rim.

12. The cap-installation signal system of claim 1, wherein a lost-motion slot formed in the closure has an arcuate shape and a center of curvature on the axis of rotation.

13. The cap-installation signal system of claim 1, further comprising a closure-rotation blocker including an anti-rotation stop located in a stationary position in a filler neck formed to include a nozzle-receiving passageway closed by the closure once the closure has reached the filler-neck closing position and a rotation-inhibitor tab coupled to an external portion of the closure to rotate therewith and arranged to mate with the anti-rotation stop during rotation of the closure about the axis of rotation in the first direction to block further rotation of the closure in the first direction without inhibiting further rotation of the handle relative to the closure about the axis of rotation in the first direction to allow temporary engagement of the lug on the handle as the handle rotates in the first direction relative to the closure to produce the discernable warning signal to inform a user rotating the handle that the closure has already reached the filler-neck closing position in the filler neck.

14. The cap-installation signal system of claim 13, wherein the rotary spring is configured to store energy during rotation of the handle in the first direction relative to the closure about the axis of rotation and then release energy once a user ungrips the handle after the discernable warning signal has been produced to provide means for rotating the handle relative to the closure about the axis of rotation in an opposite second direction to return the handle to a predetermined removal-ready position relative to the closure.

15. The cap-installation signal system of claim 1, wherein the finger of the handle-rotation limit signaler is made of a flexible material and arranged to extend upwardly toward a top plate included in the handle and the lug is coupled to the top plate and arranged to engage and deflect the upwardly extending finger to produce the discernable warning signal during rotation of the handle in the first direction about the axis of rotation relative to the closure once the closure stops rotating relative to the filler neck during installation of the closure in the filler neck.

16. The cap-installation signal system of claim 15, wherein the closure includes a base adapted to mate with the filler neck and a torque-transmission member coupled to the base to rotate therewith and arranged to lie in confronting relation to the handle, the rotary spring is coupled to the torque-transmission member, and the finger is coupled to the base to rotate therewith.

17. The cap-installation signal system of claim 16, wherein the torque-transmission member is formed to include a finger-receiving channel and the finger is arranged to extend upwardly from the base and through the finger-receiving channel to cause a free end of the finger to lie above the torque-transmission member in a position to intercept and contact temporarily the lug to produce the discernable warning signal during rotation of the handle in the first direction relative to the body of the closure.

18. A cap-installation signal system for a filler neck, the system comprising
   a handle rotatable about an axis of rotation,
   a closure adapted to close the filler neck,
   a rotary spring coupled to the handle and to the closure to cause the closure to rotate in the first direction about the axis of rotation when the closure is inserted in a nozzle-receiving passageway formed in the filler neck in response to rotation of the handle in the first direction about the axis of rotation, and
   a handle-rotation limit signaler including a finger coupled to the closure to rotate therewith and a lug coupled to the handle to rotate therewith and to intercept the finger during rotation of the handle in the first direction relative to the closure once the closure has reached a filler neck-closing position in the filler neck and ceases to rotate about the axis of rotation, and the finger and the lug cooperate to produce a discernable warning signal in response to temporary engagement of the lug and finger during rotation of the handle relative to the closure in the first direction to alert a user rotating the handle that the closure has reached the filler-neck closing position in the filler neck and ceased to rotate,
   wherein the finger of the handle-rotation limit signaler is made of a flexible material and arranged to extend upwardly toward a top plate included in the handle and the lug is coupled to the top plate and arranged to engage and deflect the upwardly extending finger to produce the discernable warning signal during rotation of the handle in the first direction about the axis of rotation relative to the closure once the closure stops rotating relative to the filler neck during installation of the closure in the filler neck,
   wherein the closure includes a base adapted to mate with the filler neck and a torque-transmission member coupled to the base to rotate therewith and arranged to lie in confronting relation to the handle, the rotary spring is coupled to the torque-transmission member, and the finger is coupled to the base to rotate therewith, and
   wherein the torque-transmission member includes an annular web arranged to surround the rotary spring and a cup coupled to an interior edge of the annular web and configured to include a spring chamber receiving a lower portion of the rotary spring.

19. The cap-installation signal system of claim 18, wherein the shell includes an upper spring mount arranged to extend downwardly into the spring chamber formed in the cup, the cup includes a lower spring mount located in the spring chamber below the upper spring mount, and the rotary spring is a torsion spring having an upper tang coupled to the upper spring mount, a lower tang coupled to the lower spring mount, and a coiled portion arranged to wind around the axis of rotation and interconnect the upper and lower tangs.

20. The cap-installation signal system of claim 18, wherein the closure further includes a pressure-relief system located below the cup in an interior region formed between the torque-transmission member and the base.

21. The cap-installation signal system of claim 5, wherein the base includes an annular upper plate arranged to underlie the annular web and the finger is coupled to the annular upper plate and arranged to extend upwardly through a finger-receiving channel formed in the torque-transmission member toward an underside of the shell.

22. The cap-installation signal system of claim 1, wherein the lug of the handle-rotation signaler is coupled to an underside of the handle and arranged to extend downwardly toward the closure, the finger of the handle-rotation limit signaler is made of a flexible material and arranged to extend upwardly toward the underside of the handle, and the lug of the handle-rotation limit signaler is arranged to engage and deflect the upwardly extending finger to produce the discernable warning signal during rotation of the handle in the first direction about the axis of rotation relative to the closure once the closure stops rotating relative to the filler neck during installation of the closure in the filler neck.

23. The cap-installation signal system of claim 22, wherein the handle includes a top plate coupled to the lug and an upper spring mount extending downwardly from the top plate into a spring chamber formed in the closure to mate with an upper end of the rotary spring located in the spring chamber, the closure further includes a lower spring mount located in the spring chamber and coupled to a lower end of the rotary spring, the handle further includes an annular rim coupled to a perimeter edge of the top plate, and the lug is arranged to lie in a space provided between the upper spring mount and the annular rim.

24. The cap-installation signal system of claim 1, wherein the rotary spring is configured to store energy during rotation of the handle in the first direction relative to the closure about the axis of rotation and then release energy once a user ungrips the handle after the discernable warning signal has been produced to provide means for rotating the handle relative to the closure about the axis of rotation in an opposite second direction to return the handle to a predetermined removal-ready position relative to the closure.

25. The cap-installation signal system of claim 24, wherein the closure is formed to include a spring chamber receiving a lower portion of the rotary spring, the handle includes an upper spring mount arranged to extend downwardly into the spring chamber, the closure further includes a lower spring mount located in the spring chamber below the upper spring mount, and the rotary spring is a torsion spring having an upper tang coupled to the upper spring mount, a lower tang coupled to the lower spring mount, and a coiled portion arranged to wind around the axis of rotation and interconnect the upper and lower tangs.

26. The cap-installation signal system of claim 15, further comprising a closure-rotation blocker including an anti-rotation stop located in a stationary position in a filler neck formed to include a nozzle-receiving passageway closed by the closure once the closure has reached the filler-neck closing position and a rotation-inhibitor tab coupled to an external portion of the closure to rotate therewith and arranged to mate with the anti-rotation stop during rotation of the closure about the axis of rotation in the first direction to block further rotation of the closure in the first direction without inhibiting further rotation of the handle relative to the closure about the axis of rotation in the first direction to allow temporary engagement of the lug on the handle as the handle rotates relative to the closure to produce the discernable warning signal to inform a user rotating the handle that the closure has already reached the filler-neck closing position in the filler neck.

27. The cap-installation signal system of claim 26, wherein the closure is formed to include a lost-motion slot and the handle includes a shell coupled to the rotary spring and configured to provide an external hand grip and an anti-rotation post coupled to the shell to rotate therewith about the axis of rotation and to extend into the lost-motion slot formed in the closure, the rotary spring is configured normally to rotate the handle in an opposite direction about the axis of rotation relative to the closure to establish an initial position of the anti-rotation post in the lost-motion slot formed in the closure, the anti-rotation post is arranged to move in the lost-motion slot in response to clockwise rotation of the shell in the first direction about the axis of rotation toward an end wall associated with the lost-motion slot relative to the closure once the closure has been rotated in the filler neck to assume the filler-neck closing position, and the lug and finger are arranged to mate temporarily and produce the discernable warning signal during movement of the anti-rotation post in the lost-motion slot between the initial position and a limit position engaging the end wall associated with the slot.

28. A cap-installation signal system for a filler neck, the system comprising
    a handle rotatable about an axis of rotation,
    a closure adapted to rotatably engage and mate with a filler neck and close a mouth opening into a nozzle-receiving passageway formed in the filler neck,
    a rotary spring coupled to the handle and to the closure and configured to cause the closure to rotate in a first direction relative to the filler neck about the axis of rotation during engagement with the filler neck in response to rotation of the handle in the first direction about the axis of rotation,
    a closure-rotation blocker including an anti-rotation stop adapted to be coupled to the filler neck and lie in a stationary position in the nozzle-receiving passageway and a rotation-inhibitor tab coupled to the closure to rotate therewith and arranged to mate with the anti-rotation stop during rotation of the closure in the first direction about the axis of rotation toward a filler-neck closing position to provide a hard stop establish the filler-neck closing position and to block any further rotation of the closure in the first direction relative to the filler neck, and
    a handle-rotation limit signaler including a finger coupled to the closure to rotate therewith and a lug coupled directly to the handle to rotate therewith and to intercept and engage temporarily the finger during rotation of the handle in the first direction relative to the closure after the closure has reached the filler-neck closing position and ceases to rotate in the first direction about the axis of rotation to produce a discernable warning signal to alert a user rotating the handle in the first direction about the axis of rotation that the closure has reached the filler-neck closing position and ceased to rotate further in the first direction.

29. The cap-installation signal system of claim 28, wherein the closure includes a base adapted to mate with the filler neck and an O-ring seal coupled to the base to move therewith and adapted to mate with the filler neck to establish a sealed connection therebetween and a torque-transmission member fixed to the base to lie in a stationary position on the base to rotate therewith and the finger is coupled to the base and arranged to extend upwardly toward the handle and past the torque-transmission member.

30. The cap-installation signal system of claim 29, wherein an upper end of the rotary spring is coupled to the handle and a lower end of the rotary spring is coupled to the torque-transmission member.

31. A cap-installation signal system for a filler neck, the system comprising
    a handle rotatable about an axis of rotation,
    a closure adapted to rotatably engage and mate with a filler neck and close a mouth opening into a nozzle-receiving passageway formed in the filler neck,
    a rotary spring coupled to the handle and to the closure and configured to cause the closure to rotate in a first direction relative to the filler neck about the axis of rotation during engagement with the filler neck in response to rotation of the handle in the first direction about the axis of rotation,
    a closure-rotation blocker including an anti-rotation stop adapted to be coupled to the filler neck and lie in a stationary position in the nozzle-receiving passageway and a rotation-inhibitor tab coupled to the closure to rotate therewith and arranged to mate with the anti-rotation stop during rotation of the closure in the first direction about the axis of rotation toward a filler-neck closing position to provide a hard stop establish the filler-neck closing position and to block any further rotation of the closure in the first direction relative to the filler neck, and
    a handle-rotation limit signaler including a finger coupled to the closure to rotate therewith and a lug coupled to the handle to rotate therewith and to intercept and engage temporarily the finger during rotation of the handle in the first direction relative to the closure after the closure has reached the filler-neck closing position and ceases to rotate in the first direction about the axis of rotation to produce a discernable warning signal to alert a user rotating the handle in the first direction about the axis of rotation that the closure has reached the filler-neck closing position and ceased to rotate further in the first direction,
    wherein the closure includes a base adapted to mate with the filler neck and an O-ring seal coupled to the base to move therewith and adapted to mate with the filler neck to establish a sealed connection therebetween and a torque-transmission member fixed to the base to lie in a stationary position on the base to rotate therewith and the finger is coupled to the base and arranged to extend upwardly toward the handle and past the torque-transmission member, and
    wherein the torque-transmission member includes an annular web arranged to surround the rotary spring and a cup coupled to an interior edge of the annular web and formed to include a spring chamber receiving a lower portion of the rotary spring, a torque-transmission lug coupled to the annular web and arranged to extend into a lug-receiving slot formed in the base to fix the torque-transmission member in fixed relation to the base.

32. The cap-installation signal system of claim 31, wherein the torque-transmission member further includes a lower spring mount coupled to the cup and to a lower end of the rotary spring and located in the spring chamber.

33. The cap-installation signal system of claim 29, wherein the torque-transmission member is formed to receive a lost-motion slot, the handle includes an anti-rotation post arranged to extend into and move back and forth in the lost-motion slot during rotation of the handle relative to the closure about the axis of rotation.

34. The cap-installation signal system of claim 33, wherein the lost-motion slot formed in the torque-transmission member has an arcuate shape and a center of curvature on the axis of rotation and the anti-rotation post is sized and arranged to engage an end wall associated with the anti-rotation post after limited movement of the anti-rotation post in the lost-motion slot during rotation of the handle in the first direction relative to the closure about the axis of rotation and after the closure arrives at the filler-neck closing position to block any further rotation of the handle in the first direction relative to the closure.

35. The cap-installation signal system of claim 29, wherein the torque-transmission member is formed to include a finger-receiving channel and the finger is arranged to extend upwardly from the base and through the finger-receiving channel to cause a free end of the finger to lie above the torque-transmission member in a position to intercept and contact temporarily the lug to produce the discernable warning signal during rotation of the handle in the first direction relative to the body of the closure.

36. The cap-installation signal system of claim 28, wherein the rotary spring is configured to store energy during rotation of the handle in the first direction relative to the closure about the axis of rotation and then release energy once a user ungrips the handle after the discernable warning signal has been produced to provide means for rotating the handle relative to the closure about the axis of rotation in an opposite second direction to return the handle to a predetermined removal-ready position relative to the closure.

\* \* \* \* \*